Oct. 3, 1944.                    R. E. PECK                    2,359,579
                    AIR CONDITIONING CONDUIT FITTING
                         Filed July 6, 1942

INVENTOR.
Robert E. Peck
BY Wood, Arey, Herron & Evans
            Attorneys.

Patented Oct. 3, 1944

2,359,579

UNITED STATES PATENT OFFICE 2,359,579

AIR CONDITIONING CONDUIT FITTING

Robert E. Peck, Cincinnati, Ohio, assignor of one-fourth to Wm. Burchenal and one-fourth to Morss Lippincott, both of Cincinnati, Ohio Continuation of application Serial No. 308,591, December 11, 1939. This application July 6, 1942, Serial No. 449,882

5 Claims. (Cl. 138—37)

This invention relates to the art of constructing and installing ducts and conduits of the type employed in air conditioning and heating systems. The invention is directed particularly to the fabrication or the manufacture of elbows and angle fittings which are required for leading conduits through turns and bends as when the conduit is to be taken around a corner or is to be taken upwardly from a horizontal run. The elbows or fittings required for such purposes may be of an angle less than 180°, for instance, 30°, 45°, 90° or 120°, to suit the requirements of the installation in the building.

The elbows and fittings of the present invention are adapted especially to be used in conjunction with conduit of the type shown in Robert E. Peck Patent No. 2,226,523 of December 24, 1940, which consists essentially of tubular lengths of asbestos containing material or laminated asbestos paper adapted to be joined to one another to form straight run sections. According to the Peck patent the sectional lengths of duct-work are comprised of one tube which is rigid and strong and another tube which contains air cavities; these tubes are telescopically or slidably associated one within another and they are assembled into a straight run of conduit on the job by staggering the sections with respect to one another, so that they may telescopically be joined together. In this manner the joints between the outer tubes occur intermediate the joints between the inner tubes. The unitary lengths each comprising an inner and an outer tube are adapted to be furnished to the job for assembly and installation there, and one of the primary objectives of the present invention has been to provide elbow fittings which also may be fabricated in a simple manner on the job from unitary lengths, or parts of them.

In the past sheet metal elbows and fittings, as well as sheet metal conduit itself, have been fabricated in the shop, then taken to the job for installation. But before this can be done a skilled person must visit the building in which the ductwork is to be installed, make the necessary measurements, prepare drawings or sketches, and then turn these over to the tinsmith or sheet metal worker for him to reproduce in metal. The process is laborious and expensive, and the present invention contemplates elbow fittings which may be made at the point of installation and with but a hammer and a saw for tools, whether from unitary lengths of duct of the type shown in the aforesaid Peck patent or from other suitable tubular material preferably of a fibrous nature that may be sawed.

It is also the objective of the present invention to provide elbow fittings and turns in which vanes are present for directing the flow of air and diverting it along a new path in such manner that the resistance to flow at the turn is minimized. Vanes of this type are sometimes called "duct turns"; they are of crescent shape and are of substantial thickness at the mid portion while the edges are somewhat feathered. The radii at the inner and outer walls are so adjusted that the area diagonally of an elbow is substantially the same as that of the run of duct. By this arrangement the velocity of the air passing through the turn is substantially the same as the velocity of the air in a run of duct preceding the turn, and the curved faces of the vanes direct the flow and minimize the turbulence which would otherwise occur. It has been an objective of the present invention to provide a fitting in which such vanes may be arranged accurately as to position and also firmly held in place.

The invention, briefly, is predicated upon the concept of providing mitred elbow-forming sections adapted to be joined to one another to provide the necessary turn or elbow and locating vanes along the mitre line. The invention further is predicated, however, upon the concept of utilizing the vanes themselves as the means for connecting the mitred sections one to the other. This result preferably is obtained by cutting a single length of duct diagonally into two pieces, the one piece, when placed in reverse complementary position with respect to the other, joining the mitred face of the other piece to provide the desired elbow formation. The vanes or duct turns of the elbow straddle the mitre or joint line and fasteners project through the walls of the respective sections at opposite sides of the mitre line into the bodies of the vanes at each end thereof so that the mitred sections are joined to one another through the vanes. Otherwise expressed, each of the mitred sections is fastened to the vanes and they, therefore, serve the double purpose of directing the flow of air through the fitting and of holding the elbow-forming elements of which the fitting is constituted in assembled relationship. The fasteners also hold the vanes firmly in position so that during usage they do not become loosened or tend to pivot on their axes to impair the air flow.

Since it is requisite that the vanes be installed relatively accurately in predetermined positions in the elbow to assist the flow of air, it is desirable that there be guide means designating the points at which nails or cleats are to be driven through the walls of the elbow-forming members in order that the nails will strike squarely into the body portion of the vane to form a rigid joint. Inasmuch as the ends of the vanes are overlapped by the elbow-forming members, the ends of the vanes are thus concealed and the guide means tells the fabricator where the nails are to be driven. For this purpose two implements are provided; one is a nailing strip of metal or paper carrying punched holes or printed marks in predetermined positions for indicating the nailing positions, and the other is a template or fixture for positioning the vane while a nail is being driven into it through the wall of one of the sections such that its curved surfaces properly direct the flow of air through the elbow.

In general, an elbow is made by first cutting a length of conduit diagonally to the given angle required to form the desired elbow and, next, cutting up a length of vane or duct turn into pieces dimensioned to fit in between the opposite side walls of the mitered pieces going to make up the elbow. A nailing strip having nailing guide marks on it at predetermined intervals (corresponding to the desired spacing of the vanes) is placed along the mitred edge of one of the elbow-forming pieces, preferably such that one half of the nailing strip marginally overlaps the mitred elbow-forming piece, while the other half extends beyond the mitred edge. A vane is then located on the fixture for positioning the vane as described above. The fixture itself is then slid along the mitred edge until it is in alignment with one of the predetermined positions indicated by the nailing strip, and a nail or fastener is driven through the nailing strip at the marked spot into the body of the vane. Successive vanes are fastened to this mitred duct turn member in the same manner and afterward the other elbow-forming piece is slipped into position with its mitred edge abutting the mitred edge of the first piece, and nails then firmly are driven through the other nailing positions indicated by the nailing strip and into the body of the duct turns. The opposite ends of the vanes which likewise straddle the joint line at the other side of the elbow, are fastened in the same manner, and finally, if desirable, additional sealing means, for example, calking or gummed tape, may be placed over the mitred joint so as to prevent the escape of air through the joint area.

The template itself may be of various sizes and shapes, but preferably is comprised of a body which is configured to receive and hold a vane in a given position relative to the template, a slide piece carried by the body for engagement with the mitred edge of an elbow-forming member, and a pointer or other suitable indicating means positioned relative to the body so that, when the pointer is aligned with the nail holes or other appropriate marks or indicia upon the nailing strip, the vane is in position to receive the nail or fastener.

The mitred elbow-forming sections may be of the double wall type as shown in the aforesaid Peck patent or of the single wall type utilizing, for example, the stiff and rigid portion of such a conduit from which to form an elbow. In such an instance the elbow may be left uncovered or, if desirable, the other section of such a conduit may be cut along the corresponding mitre line and the pieces then respectively slipped over the assembled elbow until their mitred edges meet. An advantage in the latter type of construction resides in the fact that the outer sections may project beyond the entrance and exit faces of the elbow itself to provide a staggered joint at the point of connection between the elbow and the straight run of duct-work preceding or succeeding it.

A typical embodiment of the present invention is illustrated in the accompanying drawing wherein the fabrication of a 90° angle fitting is disclosed.

Figure 1:
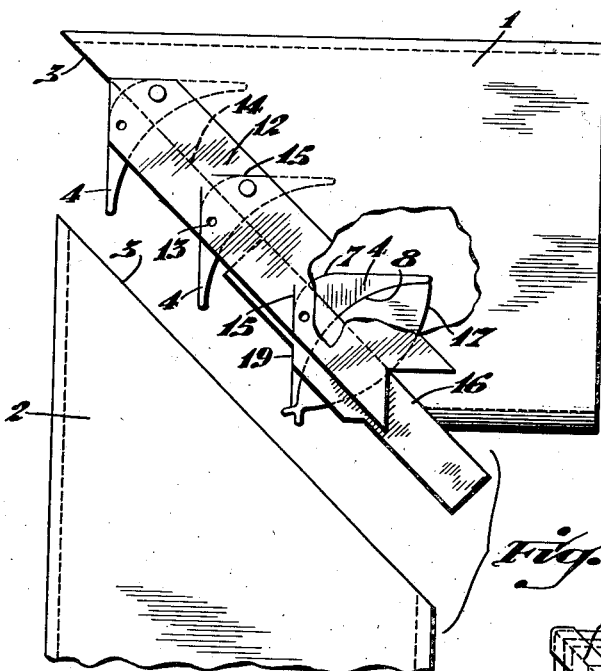
Figure 1 is a plan view of the disassembled sections of a 90° angle fitting.
Figure 2:
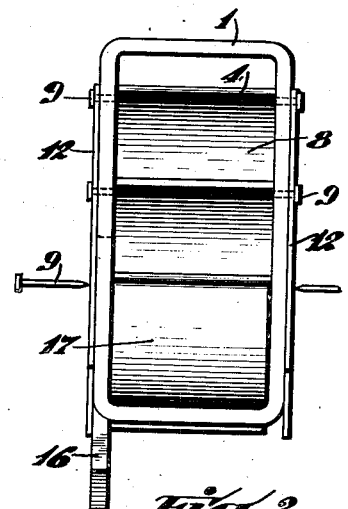
Figure 2 is an end elevation of the upper section shown in Figure 1.

As shown in the drawing, and particularly Figure 1, each fitting comprises at least two elements, 1 and 2, each having a face 3 extending transversely of it along a diagonal line, in this case a 45° angle, such that the sections 1 and 2 meet one another at a mitred joint to form a 90° or right angle fitting.

Figure 7:
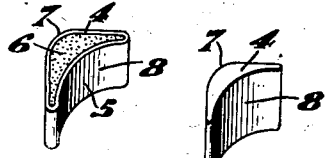
Figure 7 is a perspective view of a modified type of air directing vane.
Figure 6:
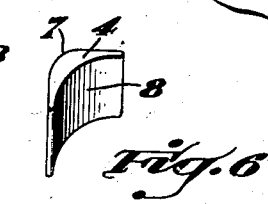
Figure 6 is a perspective view of an air directing vane or blade.

The vanes which are to be mounted at the juncture of the mitred edges 3 are indicated at 4 and preferably are made of compressed asbestos material sufficiently rigid to receive a mounting nail, or cleat, or screw. The vanes may be made in strips of substantial length, and suitable lengths can be cut by the fabricator on the job to the dimensions required in the preparation of a fitting of given cross sectional dimensions. If desirable, the vanes may be formed of metal shells or of sheet metal filled in with a material of sufficient strength to retain the nail or cleat. Thus, in Figure 7, a vane is shown formed from a metal shell 5 filled in as at 6, with a mixture of cement and fine cinders which hardens into a rigid body which will receive and hold the shanks, or nails, or cleats tenaciously.

In the fittings shown which, for example, may have an interior dimension of 5½" by 2½" three air deflecting blades or vanes are utilized to direct the air through the turn without substantial loss in velocity. The vanes 4 have back walls 7 which are slightly rounded at their juncture and, for the particular fitting being described, they may have a dimension of approximately 2½" for each wall. A curved front wall 8 constitutes the air deflecting face.

It is desirable that each vane 4 be positioned such that the curve of the front wall 8 is substantially tangential to the path of the air stream entering and emerging from the turn. The three vanes 4 in the embodiment disclosed are spaced approximately equidistantly from one another.

Figure 3:
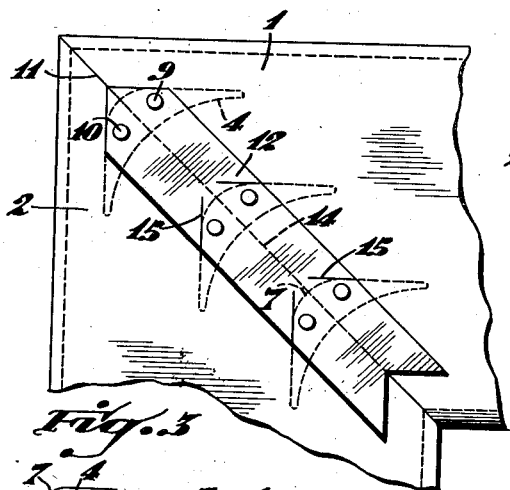
Figure 3 is a plan view of the fittings shown in Figure 1 in assembled condition.

In accordance with the present invention, and as shown particularly in Figure 3, each end of each vane preferably receives fasteners 9 and 10, respectively, the fasteners 9 passing through the wall of one elbow-forming section and longitudinally into the body of the vane at one side of the mitre line 11, and the fasteners 10 passing through the wall of the other elbow-forming section at the other side of the joint line 11. Thus, each of the mitre sections is joined to the vanes such that they have the function of directing the flow of air and the structural purpose of holding the mitre sections to one another in assembly.

As previously described, and as readily may be seen from Figures 1 and 3, the ends of the vanes straddle the joint and are therefore concealed by the walls of the elbow-forming sections. While the workman might be able to drive the nails accurately into the vanes through one of the sections, he would encounter difficulty when the other is put on because of the concealment. It is also important that the deflecting faces of the vanes be positioned to guide the flow of air without obstructing it. To facilitate the unskilled workman in obtaining this result a nailing strip or guide is utilized. This is designated 12 in the drawings and is a guide strip of metal or paper having holes punched through it or nail marks printed on it as shown at 13. These marks are arranged in pairs, the marks of each pair being spaced apart from one another a distance such that nails or fasteners driven through each of the marks of the pair may strike squarely into the body of a vane appropriately arranged beneath the strip.

As shown in the drawings the guide strip 12 contains three sets of nailing marks, one pair for each vane, and also may be provided with a guide line 14 adapted to overlie and be aligned with the mitred edge such that the nailing marks 13 may be spaced equidistantly at opposite sides of the mitre line and from the diagonal guide line 14 which may be used for locating purposes as subsequently described.

Figure 5:
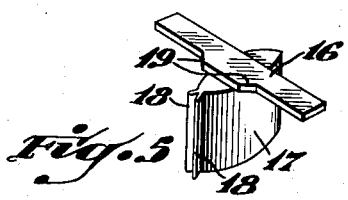
Figure 5 is a perspective view of a tool which I employ in connection with the positioning of the air deflecting blades, as shown in the assembly illustrated.

The tool or fixture illustrated in Figure 5 has a straight edge portion 16 and a template 17 of elliptical shape, the curvature of the faces thereof being substantially complementary to the curvature of a face 8 of an air deflecting vane. The template also preferably has end stops 18—18 which serve to position a vane on the template and align the vane in predetermined position with respect to the straight edge. The template is fastened to the straight edge portion 16 such that the straight edge is aligned symmetrically with respect to the curved faces of the template. The template also has upon it edges 19, or suitable scratch lines so located with respect to the template that when it is aligned with a mark or guide line 15 of the nailing strip, the vane held by the template is properly located beneath the nailing marks 13.

In assembling a fitting, a guide strip 12 is first positioned over the mitred edge of one of the elbow-forming sections with the median line 14 in alignment with the mitred edge of the section. The strip 12 is shifted along the edge until the nailing guides 13 are positioned at the points at which the vanes are to occur. Now, a vane, cut to length to fit across the face of the elbow-forming section between the inner faces of the walls thereof, is laid on a face of the fixture, the two are held together and the straight edge 16 is placed to lie against the mitre edge of the elbow-forming section. The fixture is shifted along the edge until the vane lies appropriately beneath one of the nail guides with marker edge 19 aligned with the corresponding line 15 of the strip. A nail or fastener is then driven through the appropriate nailing mark 13 into the body of the vane, and succeeding vanes are installed in the same manner. This elbow section, with the vanes attached to it at their one end, then may be flopped over and the vanes fastened in similar manner at their other end.

Subsequently the other elbow-forming section is slipped over the portions of the vanes which project beyond the mitred edge of the first, and the two sections caused to abut one another at the joint line. Nails then are driven through the other set of nail guides 13. Since these are located in predetermined positions with respect to the nails previously driven they will strike squarely into the body of the vanes which are now concealed. Fasteners finally are driven into the vanes at the opposite face of the fitting in the same manner to complete the assembly of a single wall fitting.

Figure 4:
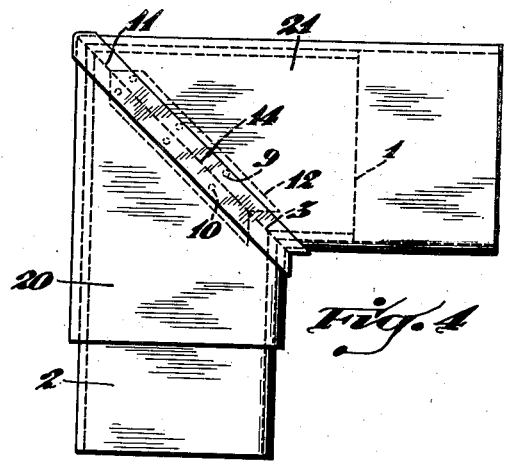
Figure 4 is a plan view of the fitting shown in Figure 3, after the exterior or outer section of conduit has been moved into position covering the inner sections at the angle joint.

Having a fitting constructed in this manner, outer tubular elements, appropriately cut to fit together on the mitre line, may be slipped over the assembled elbow-forming sections respectively, as shown in Figure 4, when heat insulation is desired.

In the construction shown in Figure 4 it will be observed that the inner member 2 at one end of the fitting projects beyond the outer member 20 thereof, while the outer member 21 at the other end of the fitting projects beyond the inner member. This result readily is accomplished by taking a section of multi-tube conduit of the type shown in the Peck patent and cutting it diagonally so as to obtain two pieces of unequal length, and the tubes are disassembled. The one set of the tubes, e. g., the inner tubes are joined together to form a fitting in the manner just described but this fitting will have one long leg and one short leg. Next a longer tube of the other (i. e. outer set) is slid over the inner section of shorter length and vice versa, so that the fitting thus is arranged for male and female connections at both its ends and staggered joints are provided at each of the points of connection of the fitting to straight run conduits.

The elbows or turns fabricated in accordance with the present invention may be dismantled at will in which case the vanes may be reutilized, and while one form of template which has been found suitable and convenient to the unskilled fabricator has been disclosed in the present application, other fixtures or locating devices may be utilized and, in fact, a careful workman after little experience has no great difficulty in forming the elbows and nailing the vanes accurately without any appliance of this sort, using nails, screws, or U-shaped cleats which extend across the joint line if desired to hold the parts in rigid assembly.

This application is a continuation of my application Serial No. 308,591, filed December 11, 1939, which has now been abandoned in favor of this application.

Having described my invention, I claim:

1. An elbow fitting for a duct, comprising tubular members of asbestos material adjoining one another along a mitre line to constitute an elbow, a plurality of duct-turn elements extending across the tubular opening in the elbow so as to direct the flow of air therethrough, the said duct turn elements having their ends respectively straddling the mitre line, and fastening members extending through the walls of said tubular members at opposite sides of the mitre line and into the bodies of the duct-turn elements, whereby the tubular members are joined to one another through the duct turn elements and the duct turn elements are held in predetermined position in the elbow.

2. A fibrous fitting for use in conduit construction comprising two elements, each having inner and outer sections, and each having an end edge extending diagonally of its length, said edges fitted together to form a desired angle fitting, and vanes secured along the meeting edge of the inner sections to direct air currents through the fitting and removable fasteners extending through walls of said inner sections and embedded in said vanes.

3. A fibrous fitting for use in conduit construction comprising two elements, each having inner and outer sections, and each having an end edge extending diagonally of its length, said edges fitted together to form a desired angle fitting, vanes secured along the meeting edge of the inner sections, and nails extending through the walls of the inner sections into the bodies of said vanes.

4. A fibrous fitting for use in conduit construction comprising two sections of conduit material each having an end edge extending diagonally of its length, said edges fitted together to form a desired angle fitting, vanes positioned along the meeting edges of the sections, and fastener means extending through the walls of said sections of conduit material into attachment with said vanes to form a self-sustaining assembly of said fitting.

5. An elbow fitting, which comprises mitred sections of duct-way adjoining one another along a mitred line and vanes disposed within the sections centrally along the mitred line in spaced relationship, and fasteners extending through the walls of the respective mitred sections into the bodies of the vanes respectively for interconnecting the mitred sections to one another, and for holding the vanes in the elbow.

ROBERT E. PECK.